United States Patent
Jose et al.

(10) Patent No.: US 12,423,462 B2
(45) Date of Patent: Sep. 23, 2025

(54) AUTOMATICALLY MASKING SENSITIVE INFORMATION DURING SCREEN SHARING

(71) Applicant: International Business Machines Corporation, Armonk, NY (US)

(72) Inventors: Robin Jose, Bangalore (IN); Tapas Saha, West Bengal (IN); Harshavardhan Changappa, Bangalore (IN); Raviprasad Pentakota, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 17/212,013

(22) Filed: Mar. 25, 2021

(65) Prior Publication Data

US 2022/0309183 A1 Sep. 29, 2022

(51) Int. Cl.
| | |
|---|---|
| G06F 21/62 | (2013.01) |
| G06F 3/14 | (2006.01) |
| G06F 9/54 | (2006.01) |
| G06F 21/84 | (2013.01) |

(52) U.S. Cl.
CPC ........ *G06F 21/6245* (2013.01); *G06F 3/1454* (2013.01); *G06F 9/542* (2013.01); *G06F 21/84* (2013.01)

(58) Field of Classification Search
CPC .. G06F 21/62; G06F 21/6218; G06F 21/6245; G06F 21/82; G06F 21/84; G06F 9/54; G06F 9/542; G06F 3/1454
See application file for complete search history.

(56) References Cited

U.S. PATENT DOCUMENTS

| | | | |
|---|---|---|---|
| 9,141,332 B2 | 9/2015 | Coleman | |
| 10,503,935 B1 | 12/2019 | Hadsall | |
| 10,853,019 B1* | 12/2020 | Schwabacher | ........ H04L 67/025 |
| 11,310,064 B2* | 4/2022 | Kubo | ................. H04L 12/1831 |
| 2006/0002315 A1* | 1/2006 | Theurer | ............. H04L 67/1095 370/261 |
| 2011/0154219 A1 | 6/2011 | Khalatian | |
| 2011/0202850 A1 | 8/2011 | Chan | |
| 2012/0036452 A1* | 2/2012 | Coleman | ................. G06F 21/55 715/751 |
| 2013/0007895 A1* | 1/2013 | Brolley | .................... G06F 21/62 726/28 |
| 2015/0033149 A1* | 1/2015 | Kuchoor | ............ H04N 21/4782 715/753 |
| 2015/0074551 A1* | 3/2015 | O'Sullivan | ........... H04L 65/403 715/753 |
| 2015/0149558 A1 | 5/2015 | Mendez | |
| 2015/0244814 A1* | 8/2015 | Khalatian | ............. H04L 67/141 715/753 |
| 2015/0278534 A1* | 10/2015 | Thiyagarajan | .......... G06F 21/84 726/28 |
| 2017/0004331 A1* | 1/2017 | Weldon | ................ G06F 21/6263 |
| 2017/0086014 A1* | 3/2017 | Hwang | ................... H04L 67/55 |
| 2018/0336373 A1* | 11/2018 | Deenadayal | .............. G06T 5/70 |

FOREIGN PATENT DOCUMENTS

JP    2019139276 A    8/2019

OTHER PUBLICATIONS

Anonymous et al., "Agent Screen Capture", Eleveo, ZOOM International, 2020, 5 Pages.
Anonymous et al., "Method for Screen and Webpage Protection", An IP.com Prior Art Database Technical Disclosure, IP.com No. IPCOM000150556D, IP.com Electronic Publication Date: Apr. 18, 2007, 3 Pages.

* cited by examiner

*Primary Examiner* — D'Arcy Winston Straub
(74) *Attorney, Agent, or Firm* — Stephen R. Yoder (57) ABSTRACT

Aspects for automatically masking sensitive information during screen sharing are described. In an embodiment, one or more processors are configured for detecting a first event corresponding to a start screen sharing session in a webpage browser; transmitting a first notification to the webpage browser to indicate the first event; masking sensitive data images in the webpage browser; detecting a second event corresponding to a stop screen sharing session in the webpage browser; transmitting a second notification to the webpage browser to indicate the second event; and unmasking the sensitive data images in the webpage browser upon receipt of the second notification. The first event and the second event are detected by a screen capturing agent in communication with the webpage browser. Communications between the screen capturing agent and the webpage browser are facilitated using Inter-Process Communication (IPC).

6 Claims, 6 Drawing Sheets

AUTOMATICALLY MASKING SENSITIVE INFORMATION DURING SCREEN SHARING

BACKGROUND

The present invention relates generally to the field of computer webpage privacy, and more particularly to automatically masking sensitive data in a webpage during a screen sharing session.

During an interactive web-based session, where a number of users are actively engaged in a videoconferencing platform, one or more of the users may share content within the videoconferencing platform. For example, a first user may be presenting information to other users using a screenshare feature so that the other users are able to view the first user's screen. During the screensharing session, the first user may share a webpage that may enable other users to view the webpage and sensitive information (e.g., passwords, API key) displayed on that webpage. This is a potential security vulnerability, which can be exploited by the other users viewing the first user's screen, especially if one or more of the other users takes a screenshot or records the shared screen or remembers the sensitive information and uses it to gain unauthorized access to some protected application or service.

SUMMARY

Aspects of the present invention disclose a computer-implemented method, computer program product, and computer system for automatically masking sensitive information during screen sharing. One embodiment of the invention may include a computer-implemented method for automatically masking sensitive information during screen sharing.

In an embodiment, the computer-implemented method may include one or more processors configured for detecting a first event corresponding to a start screen sharing session in a webpage browser; transmitting a first notification to the webpage browser to indicate the first event; masking, by the one or more processors, sensitive data images in the webpage browser; detecting, by the one or more processors, a second event corresponding to a stop screen sharing session in the webpage browser; transmitting, by the one or more processors, a second notification to the webpage browser to indicate the second event; and unmasking, by the one or more processors, the sensitive data images in the webpage browser upon receipt of the second notification. In an embodiment, the first event and the second event are detected by a screen capturing agent in communication with the webpage browser.

The computer-implemented method may further include one or more processors configured for facilitating communication between the screen capturing agent and the webpage browser using Inter-Process Communication (IPC). In an embodiment, prior to detecting the first event, the computer-implemented method may further include one or more processors configured for identifying the sensitive data images to be displayed in the webpage browser.

In an embodiment, the computer-implemented method may further include one or more processors configured for embedding a sensitive data tag in the webpage browser configured to enclose the sensitive data images. The sensitive data tag may be configured to mask the sensitive data images upon receiving the first notification and unmask the sensitive data images upon receiving the second notification.

In an embodiment, responsive to receiving the first notification at the webpage browser, the computer-implemented method may further include one or more processors configured for modifying a Document Object Model (DOM) to mask the sensitive data images. In an embodiment, responsive to receiving the second notification at the webpage browser, the computer-implemented method may further include one or more processors configured for modifying a Document Object Model (DOM) to unmask the sensitive data images.

DETAILED DESCRIPTION

Embodiments of the present invention may include one or more processors configured for utilizing inter-process communication (IPC) to resolve a communications gap between the webpage browser and the screen capturing agent as a component operating within a computing device or on a server. Further, the one or more processors may be configured to perform tagging of sensitive elements within a webpage that should be masked and unmasked in appropriate situations. Tagging the sensitive elements can be done during a development stage of the webpage using hypertext markup language (HTML), wherein sensitive elements within the webpage would be surrounded with <sensitive></sensitive> tags, which would serve as an indicator to the webpage browser which elements within the webpage should be masked and unmasked under appropriate situations.

Further, in an embodiment, the one or more processors may be configured to bring both the webpage browser and the screen capturing agent in synchronization by creating a shared memory area within the available system memory of the computing device associated with the user. For example, a shared variable may be used as a flag or a tag, to be turned on and off by the screen capturing agent to represent screen capturing activity status or event to be started and stopped, respectively. In this embodiment, the webpage browser operating within the user interface of the computing device may be configured to share the same memory resource with the screen capturing agent that is configured to continuously perform a polling operation on the shared variable to check the flag status. In the event when the flag is on, the webpage browser may be configured to infer that the screen is being shared in order to update the Document Object Model (DOM) of the presently rendered webpage, so that the sensitive elements are masked out and the visibilities of the sensitive elements are protected from the unauthorized viewing users.

In another embodiment, during a successive poll, in the event when the flag is off, the webpage browser may be configured to infer that the screen sharing event has stopped and would update the DOM again to unmask the sensitive elements. However, there may be a chance that the webpage browser is lagging by a controllable extent while performing its due masking and unmasking operations in response to screen capturing agents set and unset of the flag variable. This may result due to a time gap between the screen capturing agent setting or unsetting the flag variable, and the instant, the webpage browser is actually reading the variable. In order to minimize such lag, the one or more processors may be configured to configure the webpage browser to read the flag variable on a more frequent basis, such that the variable will be read prior to the screen sharing event occurring.

In an embodiment, the one or more processors may be configured to perform message passing, wherein the screen capturing agent is configured to create and send a message to the webpage browser immediately prior to the start screensharing event. Upon receipt of the message, the webpage browser may be configured to mask the sensitive elements from the rendered webpage. Further, momentarily after stopping the screensharing event, the screen capturing agent may be configured to send another message to the webpage browser, upon receipt of which, the webpage browser may be configured to unmask all the sensitive elements that were masked earlier.

Furthermore, in another embodiment, the screen capturing agent may be configured to be forced to wait for an acknowledgement message from the webpage browser, which the webpage browser would send back to the screen capturing agent upon successful masking of the sensitive elements and the screen capturing agent may be configured to start the screen capturing event.

In an embodiment, the computer-implemented method may include one or more processors configured for detecting a first event corresponding to a start screen sharing session in a webpage browser; transmitting a first notification to the webpage browser to indicate the first event; masking, by the one or more processors, sensitive data images in the webpage browser; detecting, by the one or more processors, a second event corresponding to a stop screen sharing session in the webpage browser; transmitting, by the one or more processors, a second notification to the webpage browser to indicate the second event; and unmasking, by the one or more processors, the sensitive data images in the webpage browser upon receipt of the second notification. In an embodiment, the first event and the second event are detected by a screen capturing agent in communication with the webpage browser.

The computer-implemented method may further include one or more processors configured for facilitating communication between the screen capturing agent and the webpage browser using IPC.

In an embodiment, prior to detecting the first event, the computer-implemented method may further include one or more processors configured for identifying the sensitive data images to be displayed in the webpage browser.

In an embodiment, the computer-implemented method may further include one or more processors configured for embedding a sensitive data tag in the webpage browser configured to enclose the sensitive data images. The sensitive data tag may be configured to mask the sensitive data images upon receiving the first notification and unmask the sensitive data images upon receiving the second notification.

In an embodiment, responsive to receiving the first notification at the webpage browser, the computer-implemented method may further include one or more processors configured for modifying a DOM to mask the sensitive data images. Responsive to receiving the second notification at the webpage browser, the computer-implemented method may further include one or more processors configured for modifying a DOM to unmask the sensitive data images.

Example embodiments described herein provide for methods, systems, and computer program products for automatically masking sensitive information during screen sharing.

The present invention will now be described in detail with reference to the Figures.

Figure 1:
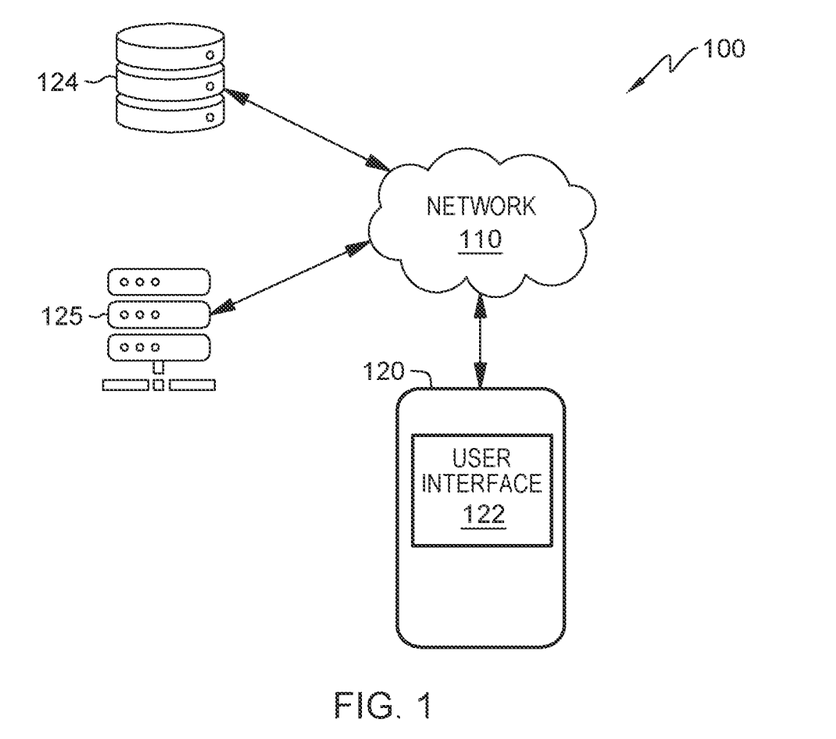
FIG. 1 depicts a block diagram of a distributed data processing environment for automatically masking sensitive information during screen sharing, in accordance with an embodiment of the present invention.

FIG. 1 depicts a block diagram of a distributed data processing environment for automatically masking sensitive information during screen sharing, in accordance with an embodiment of the present invention. FIG. 1 provides only an illustration of one embodiment of the present invention and does not imply any limitations with regard to the environments in which different embodiments may be implemented.

In the depicted embodiment, distributed data processing environment 100 includes computing device 120, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120, server 125, and database 124. Distributed data processing environment 100 may also include additional servers, computers, or other devices not shown.

Computing device 120 operates to execute at least a part of a computer program for automatically masking sensitive information during screen sharing. In an embodiment, computing device 120 may be configured to send and/or receive data from one or more of the other computing device(s) via network 110. Computing device 120 may include user interface 122 configured to facilitate interaction between a user and computing device 120. For example, user interface 122 may include a display as a mechanism to display data to a user and may be, for example, a touch screen, light emitting diode (LED) screen, or a liquid crystal display (LCD) screen. User interface 122 may also include a keypad or text entry device configured to receive alphanumeric entries from a user. User interface 122 may also include other peripheral components to further facilitate user interaction or data entry by user associated with computing device 120.

In some embodiments, computing device 120 may be a management server, a web server, or any other electronic device or computing system capable of receiving and sending data. In some embodiments, computing device 120 may be a laptop computer, tablet computer, netbook computer, personal computer (PC), a desktop computer, a smart phone, or any programmable electronic device capable of communicating with database 124, server 125 via network 110. Computing device 120 may include components as described in further detail in FIG. 6.

Computing device 120 may be configured to receive, store, and/or process data received via communication with other computing device(s) connected to network 110. For example, computing device 120 may be communicatively coupled to database 124 and/or server 125 and receive, via a communications link, data corresponding to web-based screen sharing/recording applications. Computing device 120 may be configured to store the data in memory or transmit the data to database 124 and/or server 125 via network 110 for further storage and/or processing.

Database 124 operates as a repository for data flowing to and from network 110. Examples of data include screen sharing session data, notification data, masking data, unmasking data, and other data that may be determined based on the previously mentioned data. A database is an organized collection of data. Database 124 can be implemented with any type of storage device capable of storing data and configuration files that can be accessed and utilized by computing device 120 and/or a database server, a hard disk drive, or a flash memory. In an embodiment, database 124 is accessed by computing device 120 to store data corresponding to automatically masking sensitive information during screen sharing. In another embodiment, database 124 may reside elsewhere within distributed network environment 100 provided database 124 has access to network 110.

Server 125 operates to execute at least a part of a computer program for automatically masking sensitive information during screen sharing. Server 125 can be a standalone computing device, a management server, a web server, or any other electronic device or computing system capable of receiving, sending, and processing data and capable of communicating with computing device 120 and/or database 124 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 6.

Figure 2:
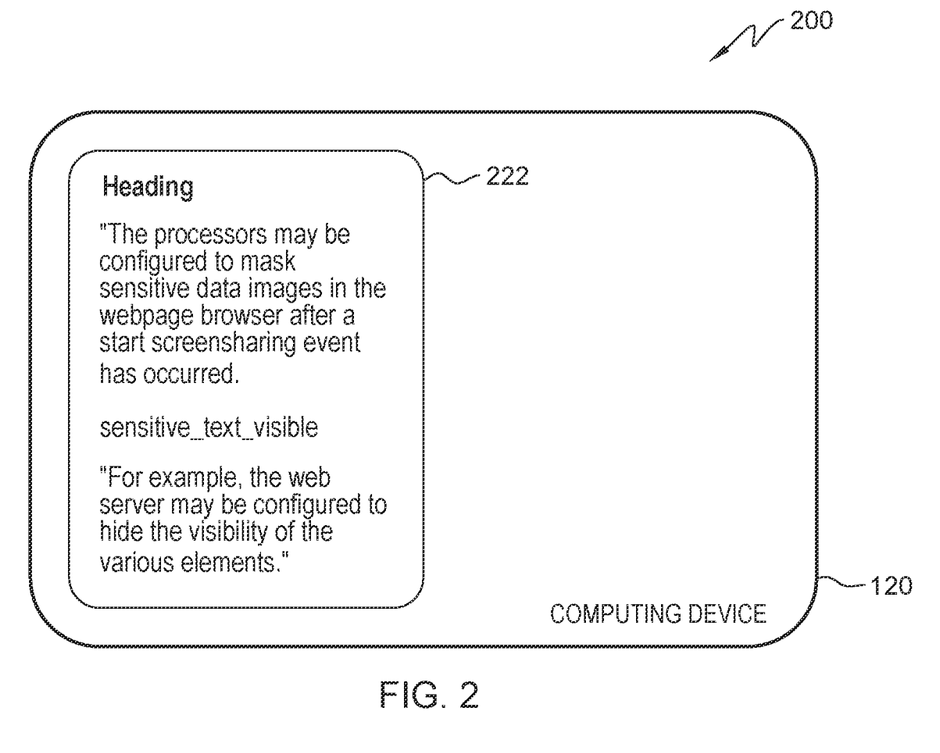
FIG. 2 depicts a block diagram of a computing device and webpage browser for automatically masking sensitive information during screen sharing, in accordance with an embodiment of the present invention.

FIG. 2 depicts a block diagram of a system 200 for automatically masking sensitive information during screen sharing, in accordance with an embodiment of the present invention. In an embodiment, webpage browser 222 is a software program executing on computing device 120 that is configured to enable a user to fetch webpages from remote web servers and render those pages so that the information within the webpages is conveyed to the user in the intended manner. The webpages typically consist of various elements including texts, graphics, and multi-media objects (e.g., audio, video). Example webpages may secure the various elements using authentication and authorization techniques configured to convey sensitive information. In this example, the one or more processors may be configured to receive user authentication information to authorize the user based on the user identity provided via biometric data or based on other user credentials provided via user identification information.

Further, the one or more processors may be configured to determine if the user has the appropriate permission to access the server to view or access the various elements displayed on webpage browser 222. An important aspect of embodiment described herein is that the web server may be configured to keep the visibility of the various elements (e.g., "sensitive_text_visible") limited to the intended user only (i.e., the user who had requested the webpage and had been able to pass all the authentication measures). For example, computing device 120 associated with the user may be configured to make images displayed on a connected monitor visible to one or more users through a modern electronic technique (e.g., screen sharing) in a web-conference or a screen activity recording, wherein the sensitive information will be hidden from the unauthorized viewing users.

Figure 3:
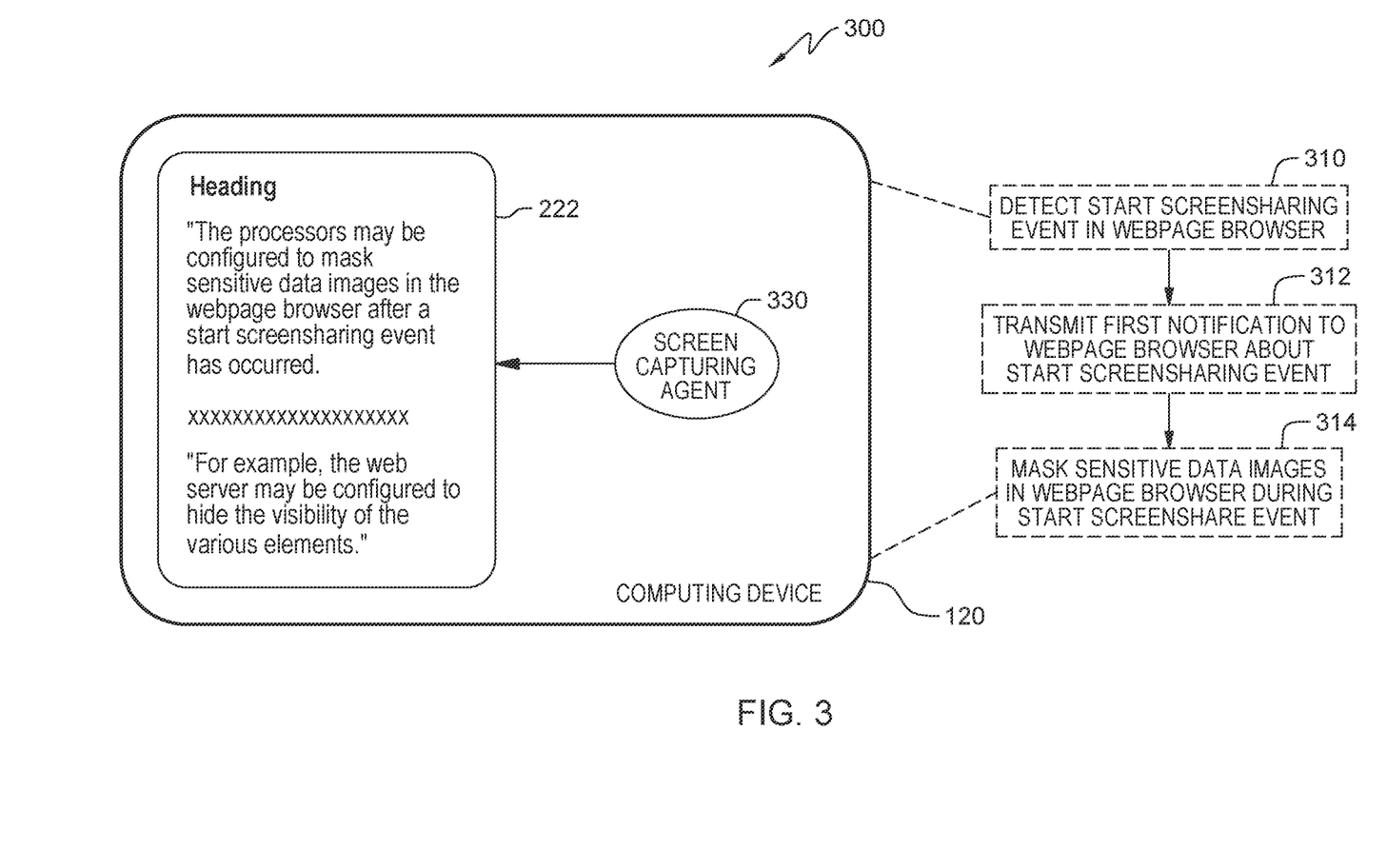
FIG. 3 depicts a block diagram of a screen capturing agent for automatically masking sensitive information during screen sharing, in accordance with an embodiment of the present invention.

FIG. 3 depicts a block diagram of a system 300 for automatically masking sensitive information during screen sharing, in accordance with an embodiment of the present invention. In an embodiment, the one or more processors may be configured to detect 310 a start screensharing event in a webpage browser. For example, one or more processors (e.g., screen capturing agent 330) may be a web-based conferencing component executing within computing device 120 configured to receive user input corresponding to a command to begin a screensharing event while executing a visual program within the user interface. Further, the user may be referred to as a presenter who may electronically share a view of their computer screen to the other participants of the conference. In another embodiment, screen capturing agent 330 may be a web-based conferencing component executing within computing device 120 configured to receive user input corresponding to a command to begin a screen recording event, wherein the user screen may be recorded in a video format. During a screen recording, the one or more processors may be configured to capture or record all parts of the user's computer display at a given point in time.

In an embodiment, the one or more processors may be configured to transmit 312 a first notification to a webpage browser, e.g., webpage browser 222, about the start screensharing event. For example, upon initiation of the screensharing event, the one or more processors may be configured to generate a notification to alert the user that at least a portion of the webpage browser is being shared with other participants in the web-based conference. Further, at the webpage browser end, the one or more processors may not be configured to know which elements of the presently rendered webpage are sensitive unless provided with some indication of the sensitive text. For example, if a user shares a screen with other users, the webpage browser may not be equipped to automatically hide sensitive information. Therefore, the one or more processors may be configured to receive instructions to identify sensitive text to be displayed during a screen sharing event.

In an embodiment, the one or more processors may be configured to mask 314 sensitive data images in the webpage browser after a start screensharing event has occurred. For example, the web server may be configured to hide the visibility of the various elements (e.g., "sensitive_text_visible") and make the hidden elements visible to the intended user only. For instance, the one or more processors may be configured to receive instructions from the user or from a software program to tag sensitive information that may be displayed within webpage browser 222 of computing device 120. A tag may include HTML code or any other computer programming instructions configured to label certain text or data images that correspond to sensitive information. Then, once the webpage browser receives a screensharing event notification or detects 310 a start screensharing event, the one or more processors may be configured to hide the text or images corresponding to the labeled sensitive information. So once the screensharing event begins, the sensitive data images will be hidden or masked from the other users participating in the web-based conference.

Figure 4:
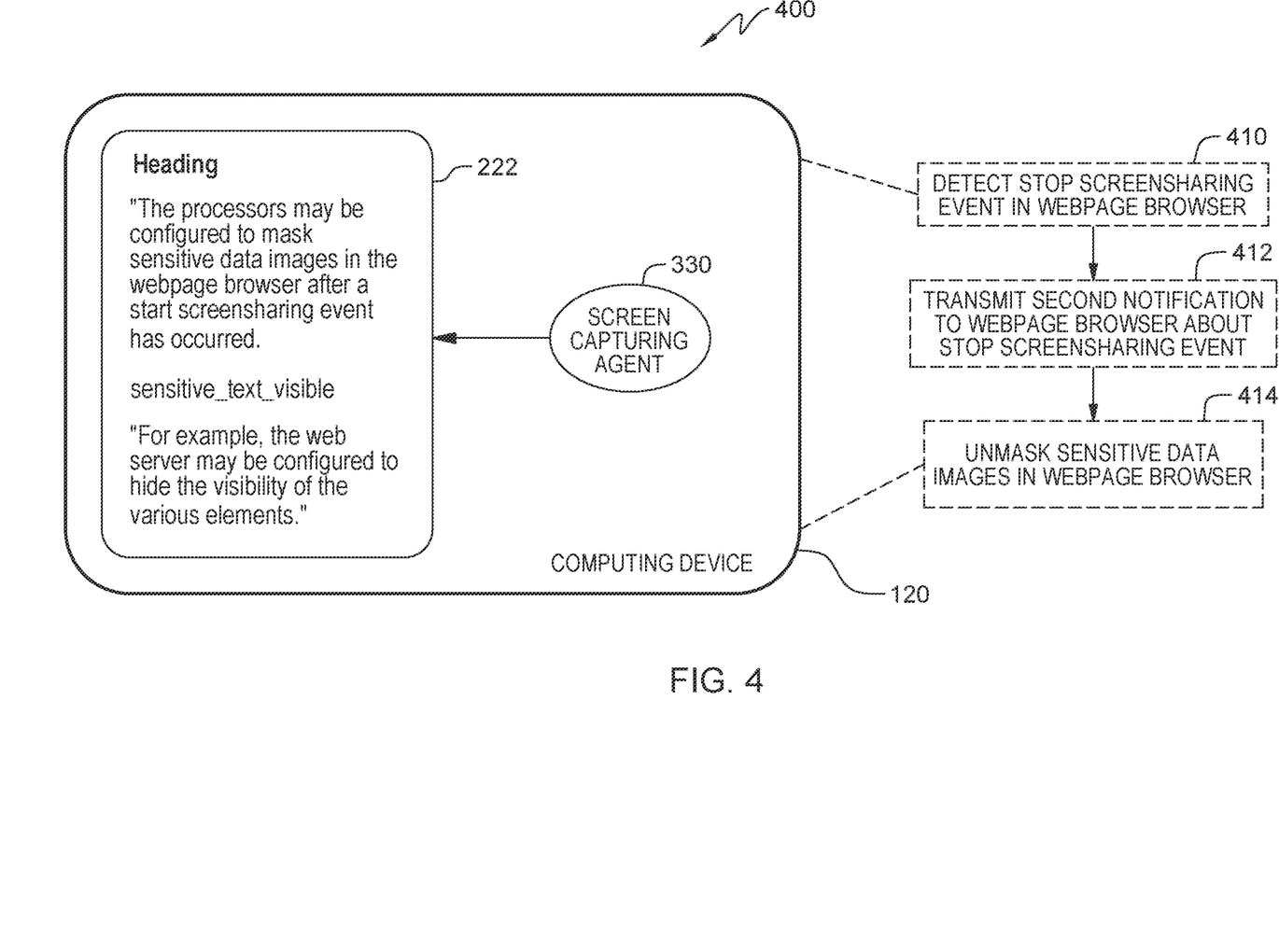
FIG. 4 depicts a block diagram of a computing device and webpage browser for automatically unmasking sensitive information during screen sharing, in accordance with an embodiment of the present invention.

FIG. 4 depicts a block diagram of a system 400 for automatically unmasking sensitive information during screen sharing, in accordance with an embodiment of the present invention. In an embodiment, using screen capturing agent 330, the one or more processors may be configured to detect 410 a stop screensharing event in a webpage browser, e.g., webpage browser 222 of computing device 120. For example, the stop screensharing event may be detected as a user input corresponding to a command to terminate the screensharing access. The stop screensharing event may also be detected as a computer program instruction corresponding to a command to terminate the screensharing access, wherein the instruction may be based on a condition of time, security, or another condition that when satisfied, terminates the screensharing access.

In an embodiment, the one or more processors may be configured to transmit 412 a second notification to the webpage browser about the stop screensharing event. The second notification can be transmitted similarly to how the first notification is transmitted, except that the second notification indicates the screensharing event is stopped or terminated.

In an embodiment, the one or more processors may be configured to unmask 414 the sensitive data images in the webpage browser. For example, upon completion of the screensharing event, the one or more processors may be configured to unmask or unhide the sensitive information.

Figure 5:
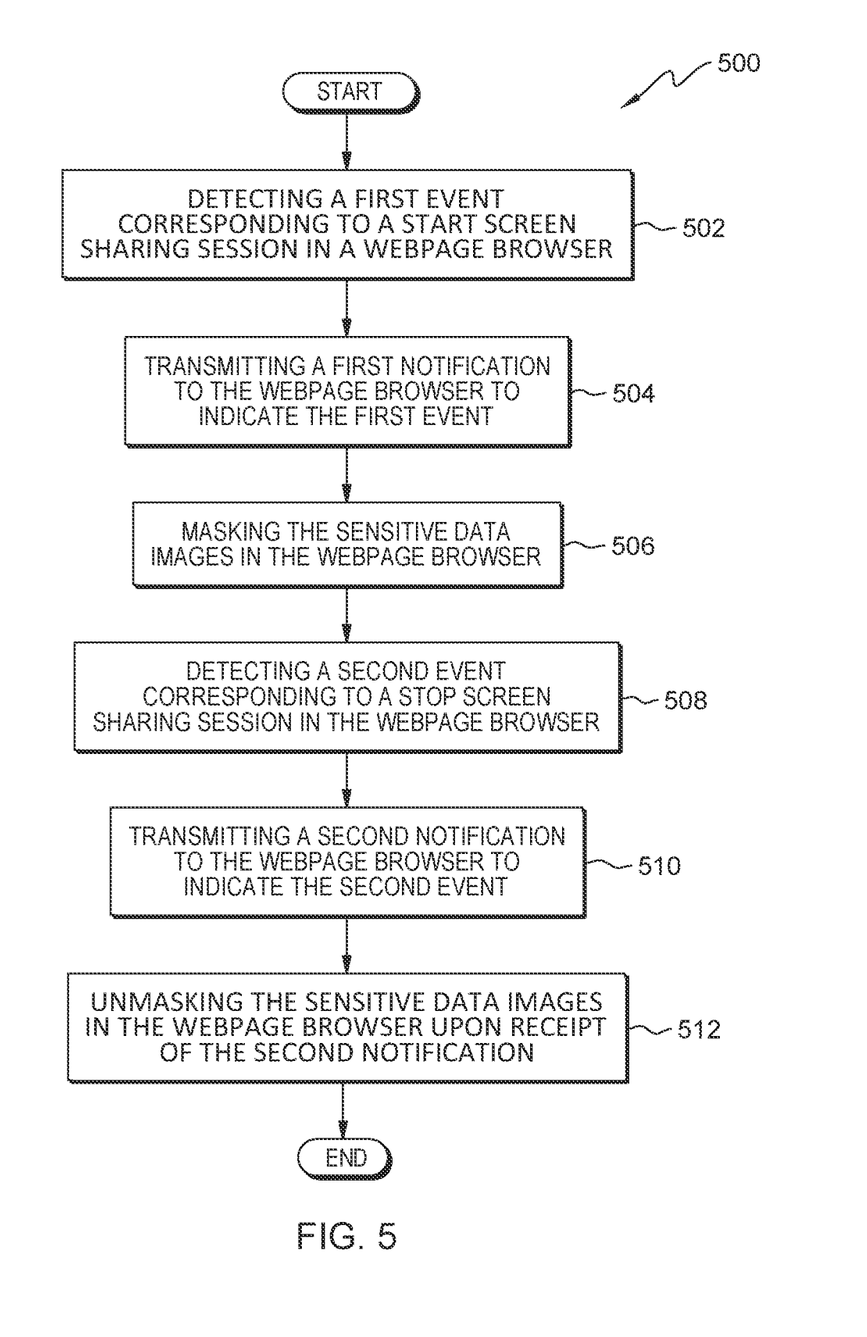
FIG. 5 depicts a flow chart of steps of a computer-implemented method for automatically masking sensitive information during screen sharing, in accordance with an embodiment of the present invention.

FIG. 5 depicts a flowchart of steps of a computer-implemented method 500 for automatically masking sensitive information during screen sharing, in accordance with an embodiment of the present invention.

In an embodiment, the one or more processors may be configured for detecting 502 a first event corresponding to a start screensharing session in a webpage browser. In an embodiment, the one or more processors may be configured for facilitating communication between the screen capturing agent and the webpage browser using Inter-Process Communication (IPC). In an embodiment, prior to detecting the first event, the one or more processors may be configured for identifying the sensitive data images to be displayed in the webpage browser and embedding a sensitive data tag in the webpage browser configured to enclose the sensitive data images.

In an embodiment, the one or more processors may be configured for transmitting 504 a first notification to the webpage browser to indicate the first event.

In an embodiment, the one or more processors may be configured for masking 506 the sensitive data images in the webpage browser. The sensitive data tag may be configured to mask the sensitive data images upon receiving the first notification and unmask the sensitive data images upon receiving the second notification. In an embodiment, responsive to receiving the first notification at the webpage browser, masking the sensitive data images may further include one or more processors configured for modifying a Document Object Model (DOM) to mask the sensitive data images.

In an embodiment, the one or more processors may be configured for detecting 508 a second event corresponding to a stop screen sharing session in the webpage browser.

In an embodiment, the one or more processors may be configured for transmitting 510 a second notification to the webpage browser to indicate the second event. In an embodiment, the first event and the second event are detected by a screen capturing agent in communication with the webpage browser.

In an embodiment, the one or more processors may be configured for unmasking 512 the sensitive data images in the webpage browser upon receipt of the second notification. In an embodiment, unmasking the sensitive data images may further include, responsive to receiving the second notification at the webpage browser, one or more processors configured for modifying a Document Object Model (DOM) to unmask the sensitive data images.

Figure 6:
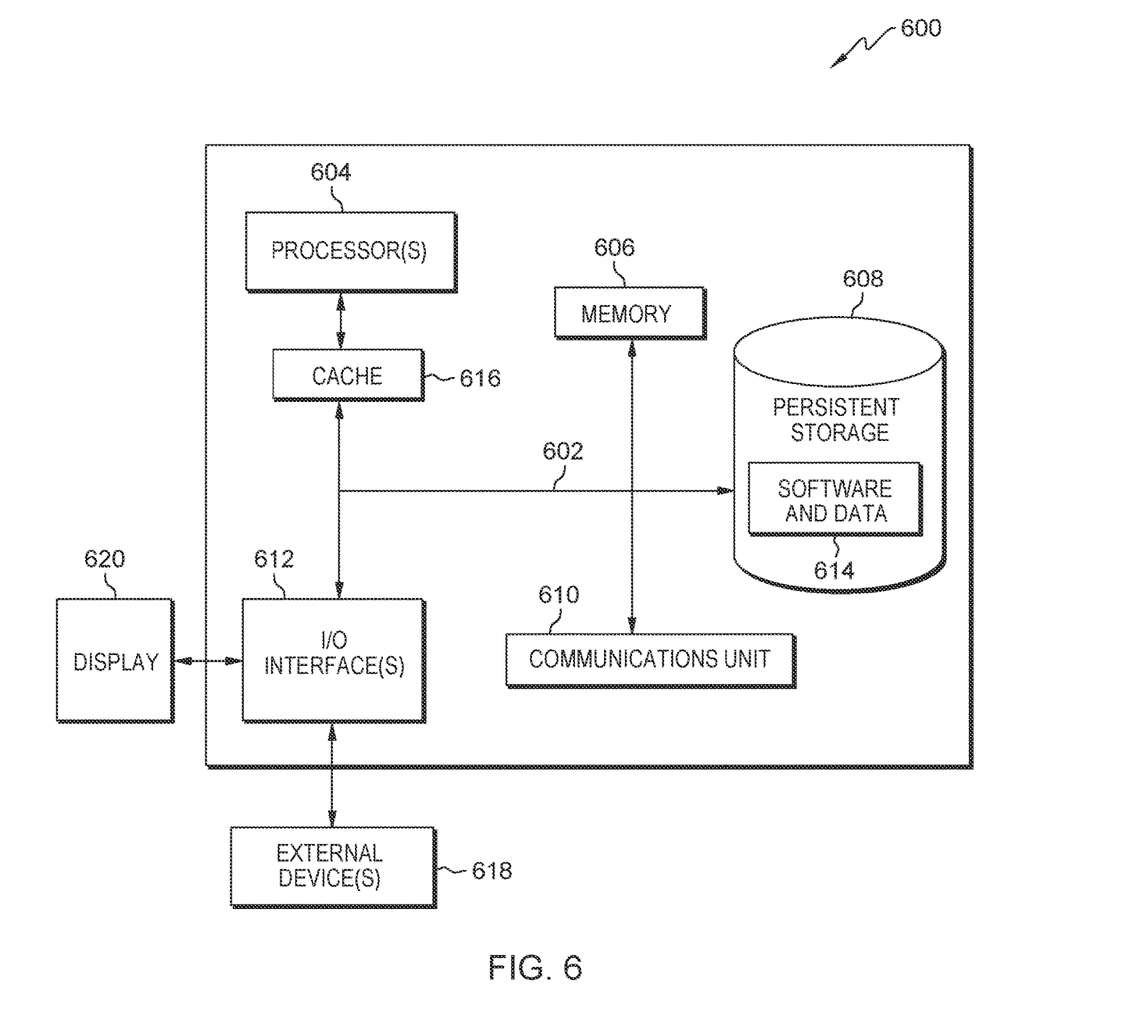
FIG. 6 depicts a block diagram of components of the server computer executing the computer-implemented method for automatically masking sensitive information during screen sharing within the distributed data processing environment of FIG. 1, in accordance with an embodiment of the present invention.

FIG. 6 depicts a block diagram of components of a computer 600, e.g., computing device 120 and/or server 125, executing the computer-implemented method 500 for automatically masking sensitive information during screen sharing within the distributed data processing environment of FIG. 1, in accordance with an embodiment of the present invention.

Computer 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs, as described herein, may be downloaded to persistent storage 608 through communications unit 610.

I/O interface(s) 612 allows for input and output of data with other devices that may be connected to server 125 and/or computing device 120. For example, I/O interface 612 may provide a connection to external devices 618 such as an image sensor, a keyboard, a keypad, a touch screen, and/or some other suitable input device. External devices 618 can also include portable computer readable storage media such as, for example, thumb drives, portable optical or magnetic disks, and memory cards. Software and data 614 used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

Software and data 614 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for automatically masking sensitive information during screen sharing, the computer-implemented method comprising:
   establishing a shared memory area within a computing device for a webpage browser and a screen capturing agent, the shared memory area storing a shared variable to be turned on and off according to a screen capturing activity status;
   detecting, by the screen capturing agent, a start screensharing event corresponding to the screen capturing activity status, the start screensharing event indicating a start of a screen sharing session in the webpage browser;
   responsive to detecting the start screensharing event, turning on, by the screen capturing agent, the shared variable indicative of the detected screen capturing activity status;
   performing, by the webpage browser, a polling operation on the shared variable to check the screen capturing activity status;
   responsive to the shared variable being turned on, identifying, by the webpage browser, sensitive data images within a webpage to be shared in the screen sharing session, the sensitive data images being surrounded with hypertext markup language (HTML) tags indicating data images to be masked;
   masking, by the webpage browser, the sensitive data images in the webpage browser during the screen sharing session by updating a document object model of the webpage; and
   waiting, by the screen capturing agent, for an acknowledgment message, communicated over an inter-process communication channel, from the webpage browser that the sensitive data images have been masked before displaying the screen sharing session.

2. The computer-implemented method of claim 1, further comprising:
   prior to detecting the start screensharing event, identifying the sensitive data images within the webpage; and
   embedding the HTML tags in the webpage to indicate the sensitive data images.

3. A computer program product for automatically masking sensitive information during screen sharing, the computer program product comprising:
   one or more computer readable storage media and program instructions stored on the one or more computer readable storage media, the program instructions comprising:
      program instructions to establish a shared memory area within a computing device for a webpage browser and a screen capturing agent, the shared memory area storing a shared variable to be turned on and off according to a screen capturing activity status;
      program instructions to detect a start screensharing event corresponding to the screen capturing activity status, the start screensharing event indicating a start of a screen sharing session in the webpage browser;
      program instructions to, responsive to detecting the start screensharing event, turn on, by the screen capturing agent, the shared variable indicative of the detected screen capturing activity status;
      program instructions to perform a polling operation on the shared variable to check the screen capturing activity status;
      program instructions to, responsive to the shared variable being turned on, identify sensitive data images within a webpage to be shared in the screen sharing session, the sensitive data images being surrounded with hypertext markup language (HTML) tags indicating data images to be masked;
      program instructions to mask the sensitive data images in the webpage browser during the screen sharing session by updating a document object model of the webpage; and
      program instructions to wait for an acknowledgment message, communicated over an inter-process communication channel, from the webpage browser that the sensitive data images have been masked before displaying the screen sharing session.

4. The computer program product of claim 3, the program instructions further comprising:
   program instructions to, prior to detecting the start screensharing event, identify the sensitive data images within the webpage; and
   program instructions to embed the HTML tags in the webpage to indicate the sensitive data images.

5. A computer system for automatically masking sensitive information during screen sharing, the computer system comprising:
   one or more computer processors;
   one or more computer readable storage media;
   program instructions stored on the one or more computer readable storage media for execution by at least one of the one or more processors, the program instructions comprising:
      program instructions to establish a shared memory area within a computing device for a webpage browser and a screen capturing agent, the shared memory area storing a shared variable to be turned on and off according to a screen capturing activity status;

program instructions to detect a start screensharing event corresponding to the screen capturing activity status, the start screensharing event indicating a start of a screen sharing session in the webpage browser;

program instructions to, responsive to detecting the start screensharing event, turn on, by the screen capturing agent, the shared variable indicative of the detected screen capturing activity status;

program instructions to perform a polling operation on the shared variable to check the screen capturing activity status;

program instructions to, responsive to the shared variable being turned on, identify sensitive data images within a webpage to be shared in the screen sharing session, the sensitive data images being surrounded with hypertext markup language (HTML) tags indicating data images to be masked;

program instructions to mask the sensitive data images in the webpage browser during the screen sharing session by updating a document object model of the webpage; and program instructions to wait for an acknowledgment message, communicated over an inter-process communication channel, from the webpage browser that the sensitive data images have been masked before displaying the screen sharing session.

6. The computer system of claim 5, the program instructions further comprising:

program instructions to, prior to detecting the start screensharing event, identify, by the one or more processors, the sensitive data images within the webpage; and program instructions to embed, by the one or more processors, the HTML tags in the webpage to indicate the sensitive data images.

\* \* \* \* \*